METHOD OF PRODUCING A MAGNETIC TRANSDUCING HEAD

Filed April 2, 1969 2 Sheets-Sheet 1

INVENTORS
ALFRED T. HARDARDT
HENRY C. SCHICK
JOHN H. WESTERMANN

BY A. Sidney Alpert
ATTORNEY

United States Patent Office 3,611,557

Patented Oct. 12, 1971

3,611,557

METHOD OF PRODUCING A MAGNETIC TRANSDUCING HEAD

Alfred T. Hardardt, Wappingers Falls, Henry C. Schick, Hopewell Junction, and John H. Westermann, Poughkeepsie, N.Y., assignors to International Business Machines Corporation, Armonk, N.Y.

Filed Apr. 2, 1969, Ser. No. 812,723
Int. Cl. H01f 7/06
U.S. Cl. 29—603 5 Claims

ABSTRACT OF THE DISCLOSURE

A laminar-like module for use in producing a multiple magnetic transducing head is disclosed, together with a method of fabricating the module. A plurality of separate components are placed in stacked relationship in a fixture, with intervening heat-activatable adhesive sheets. The working gap between the magnetic cores is set, transverse relative movement between the cores is prevented, the coil leads are attached to exposed pads on connector pins, and various tests performed on the module prior to final assembly. If the tests are successful, the components are fastened together by activating the adhesive.

BACKGROUND OF THE INVENTION

This invention relates generally to the field of magnetic transducing heads, and more particularly to so-called multiple, multi-track or multi-channel heads, i.e., those heads having a plurality of tracks, each of which is a duplicate of the other and provides a separate recording or reading channel. The invention also relates to methods of fabricating such tracks and heads.

Multi-track magnetic transducing heads have been fabricated in various ways in the past. One approach was to provide a mounting block or frame having slots for receiving coil and core assemblies, with the assemblies being separately placed therein and affixed by potting or the like to form a head half-section. Another approach involved the use of mounting pins on which coil assemblies were stacked, to form the entire head at once. In this latter approach, the core and coil assemblies were adjusted and fixed in place by bolts, adhesive or potting compound to form a complete head. Both these approaches suffer from several deficiencies, the major one being that once assembled, it was difficult or impossible to disassemble the head or head half-section to repair a broken wire or replace a track.

More recent approaches to the fabrication of multiple heads are exhibited in co-pending U.S. patent applications of W. L. Bowers et al., Ser. No. 697,494, filed Jan. 12, 1968, and L. H. Faure et al. Ser. No. 696,009, filed Jan. 4, 1968. In the former application, discrete track half-sections are produced by molding a core and coil assembly and pin carrying block in a fixture to form a single channel or track for a head half-section. In the latter approach, a head half-section is produced by locating core and coil assemblies and shields in a consumable fixture and then molding the parts in place in the fixture. Both these approaches are extremely useful for their particular applications, and represent vast improvements over other previous approaches. However, still further improvements in methods of fabricating multiple heads are possible.

None of the above-described approaches involve the fabrication of a truly modular head, i.e., a multiple head having modules or duplicate, discrete channels or tracks, each of which comprises two core and coil assemblies spaced apart to provide a gap. One reason such an approach has not been attempted previously, is that it has been impossible to provide, inter alia, accurate gaps, aligned cores, and an accurate pitch (or the center distance between any two adjacent gaps) by previously known techniques.

Accordingly, it is an object of the present invention to provide a multiple magnetic transducing head of improved construction.

It is another object of the present invention to provide a truly modular multiple magnetic transducing head.

It is a further object of the present invention to provide an improved magnetic transducing head and method of making it in which the alignment and dimensions of individual gaps and the alignment of cooperating core and coil assemblies is accurately controlled.

It is another object of the present invention to provide an improved module for use in constructing a multi-track magnetic transducing head and a method of fabricating such a module.

It is another object of the present invention to provide an improved modular magnetic transducing head which may be tested prior to final assembly and disassembled to replace defective tracks.

It is yet a further object to provide an improved module for use in multiple transducing heads which may be tested prior to final assembly and disassembled to replace defective core and coil assemblies.

It is a final object of the present invention to provide an improved multiple magnetic transducing head having laminated, modular tracks that are safer, easier and more conomical to produce.

SUMMARY OF THE INVENTION

In accordance with the preferred embodiment of the invention, there is provided a module or single track for use in fabricating a multiple magnetic transducing head. The module is a multi-layered laminated part including centrally located core and coil assemblies forming a magnetic path, and an accurately dimensioned angular gap. Adjacent to the core and coil assemblies is a pin carrier and insulator member having embedded terminal pins to which the coils are attached. Also in the laminated part are at least two magnetic shields which provide inter-gap magnetic shielding for each module when a stack of modules are arranged to form a multiple head.

The present module or single track is adapted for use in a multiple magnetic transducing head. It is advantageous in practice inasmuch as it permits separate or single tracks to be tested prior to final assembly and then used immediately or stored for future use. Furthermore, it has an extremely accurate gap and good tolerances, which is especially important in the case of an angular gap head.

In accordance with another aspect of the invention, the above module is fabricated by initially locating, on four pins of an assembly fixture, a magnetic shield. The pins include two fixed locating pins and two movable camming pins. A first adhesive sheet, another magnetic shield, and another adhesive sheet are placed on the pins over the shield. At this time, a pin carrier and insulator member is positioned in the fixture. The pin carrier member is accurately located with respect to the fixture and other components of the module by having one of its terminal pins being placed in a locating slot. The two core and coil assemblies are then mounted in an opening in the pin carrier member, and, with the two cores held in alignment, a spacer is placed between the cores to provide a working gap. The cores are then moved relative to each other by actuating the camming pins to accurately form the gap as an aligning slide is moved into place to prevent relative transverse movement of the cores with respect to each other. At this time, another adhesive sheet and another magnetic shield are placed into the fixture and the fixture cover mounted over the components. After welding, appropriate tests are performed on the coils to assure their continuity and performance. If the module passes the tests, the components are laminated by subjecting the fixture carrying the previously placed components to an elevated temperature, thereby causing adjacent components to be bonded together.

The above module fabricating process is especially useful in producing the subject modules since it permits precise gap alignment of an angular gap in a single fixture, without costly and time consuming tooling or extra-fixture processing. Further, the present process avoids molding or potting at this stage of head fabrication, with attendant benefits in safety and set-up time savings. In addition, the process permits testing and repairing prior to finally laminating the components.

DESCRIPTION OF THE PREFERRED EMBODIMENTS

Figures 1, 2, 3:
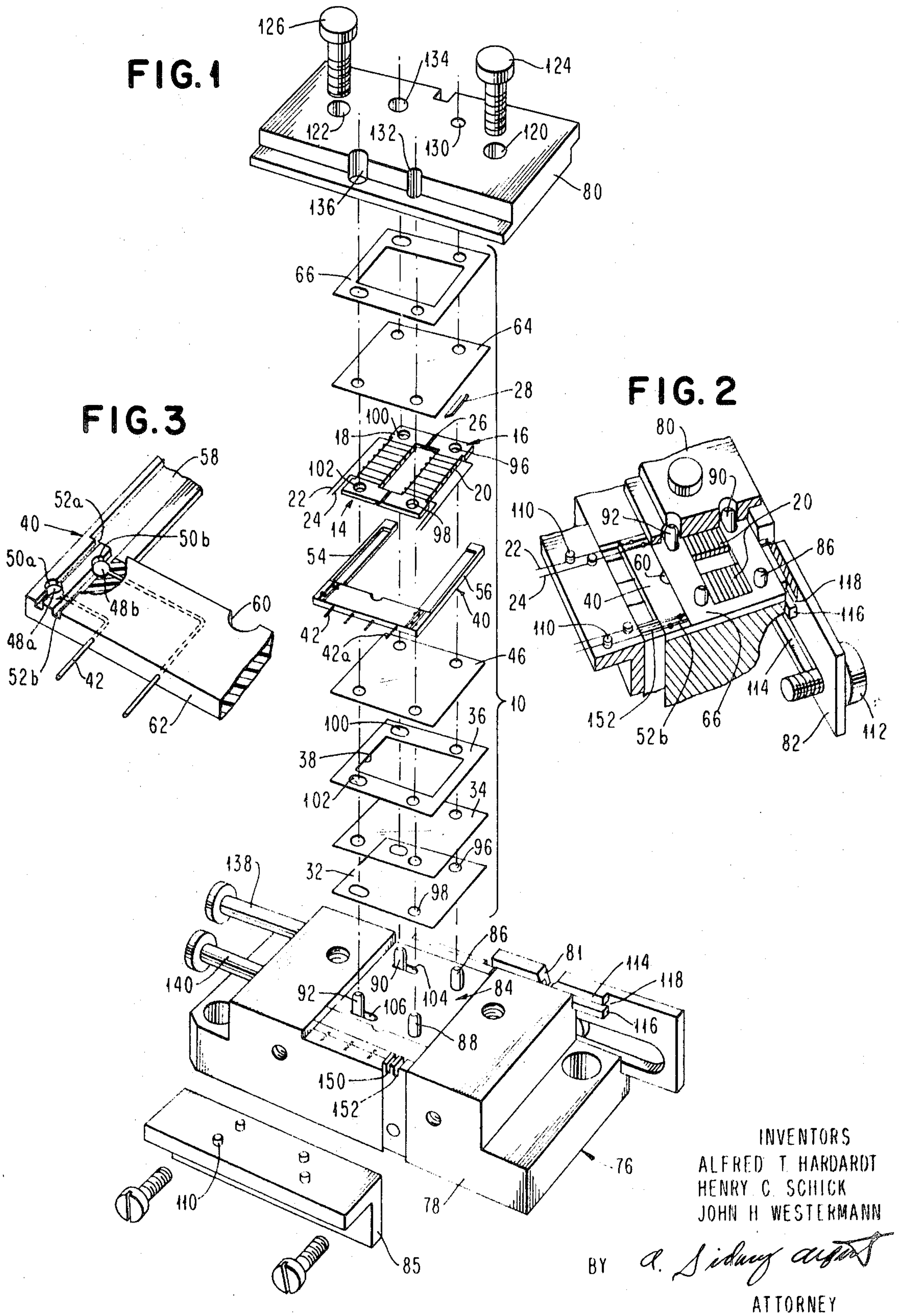
FIG. 1 is an exploded perspective view of a fixture used in assembling the module comprising the present invention, showing each of the components of the module in the order they are assembled into the fixture.
FIG. 2 is a perspective view, partially broken away, showing the manner in which the aligning slide is used to prevent transverse movement of the cores during fabrication of the module.
FIG. 3 is an enlarged partial perspective view showing the pin carrier member forming a portion of the module comprising the present invention.
Figure 6:
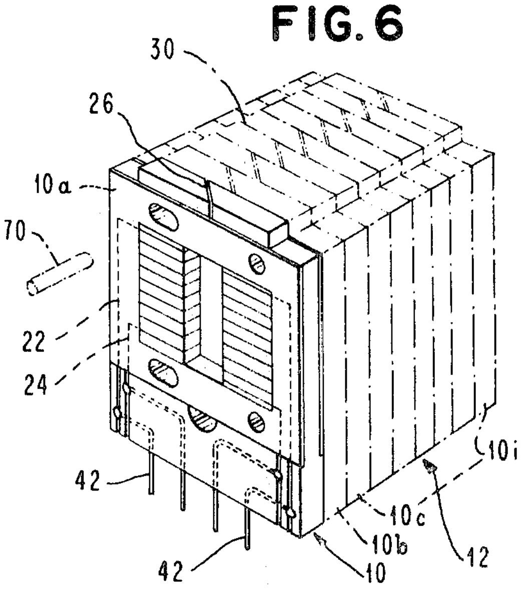
FIG. 6 is a perspective view of a completed module showing its relationship to other modules to form a multiple head.

Referring now to the drawings, and specifically to FIGS. 1 and 6, there is shown a tape head module that is generally designated by reference numeral 10. The particular embodiment of the tape head module 10 shown in FIG. 6 forms one track of a multiple magnetic transducing head generally designated by reference numeral 12. As will be seen, the head 12 includes a plurality of tracks or modules 10, each of which is constructed in generally the same manner, i.e., in accordance with the process of the present invention. The module is a multilayered laminated part having centrally located core and coil assemblies generally designated by reference numerals 14 and 16. Each core and coil assembly includes a magnetic core 18 and a coil 20 as shown in FIG. 1. Each of the coils 20 has a pair of leads 22 and 24 therefrom. The cores 20 are arranged to provide a magnetic path having an accurately dimensioned gap 26 in which is provided a nonmagnetic gap spacer 38. As will be seen, the gap 26 of the preferred module 10 is an angular gap, which in the preferred embodiment is at a 45° angle to the path of a traveling magnetic recording medium (not illustrated) traversing the head surface 30.

As noted previously, the module 10 is of a laminar-like construction including a plurality of laminae or components each of which lies in essentially a separate plane. Thus, by referring to FIG. 1, it will be noted that the module 10 includes a magnetic shield 32 which, in the preferred embodiment, is a thin sheet of iron-nickel alloy. The shield 32 is provided for inter-track shielding as will be appreciated by those skilled in the art. An important feature of the present invention is that the shield 32 as well as other shielding means in the module 10 are built right into the module and do not have to be separately placed during fabrication of the multiple head 12.

In the next plane adjacent the magnetic shield 32 is a heat-activatable adhesive sheet 34 which, during the process of fabricating the head, is used to bond the magnetic shield 32 to a magnetic shielding window 36. In the actual practice of the invention, the adhesive sheet 34 is a thin pre-pregnated type of curable adhesive, approximately one mil in thickness, such as that sold by American Cyanamid Corporation under the designation 1044R. As is known to those skilled in the art, such heat-activatable adhesive sheets have a B-stage epoxy impregnated therein which may be cured by sufficient pressure and/or heat.

As previously noted, the adhesive sheet 34 bonds together the magnetic shields 32 and 36. The shield 36 has a window or opening 38 therein to permit clearance for coils 20, and is a Phosphor bronze alloy. The window shield 36 also provides magnetic inter-track shielding for the module 10 and is used to build the module to its desired width.

Lying in substantially the same plane as the core and coil assemblies 14 and 16, is a generally U-shaped pin carrier and insulator member 40 that is provided to insulate the cores 18 and coils 20 and to carry connector pins such as pin 42. Another adhesive sheet 46 is provided to bond the pin carrier member 40 and core and coil assemblies 14 and 16 to the window-shield 36.

The pin carrier and insulator member 40 is shown in FIGS. 1 and 3. As will be seen in these figures, member 40 is an insulating piece that substantially surrounds the core and coil assemblies. Its function is to provide spacing and insulation, and to carry the connector pins 42 to provide easy access to the pins for connecting the leads 22 and 24 of the coils 20. In addition, the member 40 is a dimensionally stable part that furthers the scheme of providing a unitary module 10 that may be constructed apart from the multiple head 12, and together with other modules be easily fastened together to fabricate the multiple head 12. In practice, the part 40 is a glass-filled phenolic with embedded connector pins. The connector pins 42 are generally L-shaped, as shown particularly in FIG. 3 and have crushed or weld-pad portions **48*a* and 48*b* that are provided during the fabrication of the member 40. The weld pads 48*a* and 48*b* are accessible or exposed by virtue of openings 50*a* and 50*b* in the face of pin carrier 40. Also opening in this face of the pin carrier 40, and connected with the openings 50*a* and 50*b* are routing or lead-receiving channels 52*a* and 52*b*. The purpose of openings 50*a* and 50*b* and channels 52*a* and 52*b* will be more readily apparent when a discussion of the present process is undertaken. The legs 54 and 56 of the pin carrier 40 are relieved as indicated at 58 to better receive the core and coil assemblies 14 and 16. Thus, it will be appreciated that the coils 20, while shown schematically in FIG. 1, are normally wrapped with suitable insulation, and that the relieved or clearance portions 58 are provided so that the wrapped coils will readily fit between the legs 54 and 56. The pin carrier 40 also has a recess or peep hole 60 in its bight portion 62**, the purpose of which will be explained hereinafter.

In order to bond the core and coil assemblies 14 and 16 and pin carrier 40 to the next plane or laminae in the module 10, there is provided another adhesive sheet 64. The adhesive sheet 64 bonds those components to another Phosphor bronze alloy magnetic shielding window 66. It will be understood that each module 10 in the multiple head 12 is essentially of the same laminar-like construction, having generally centrally located core and coil assemblies 14 and 16 with outer magnetic shielding means such as the shields 32, 36 and 66. Furthermore, if desired, the outermost module, such as the module designated 10*a* in FIG. 6, may have an additional magnetic shield such as shield 32 on its outer or exposed face to complete the inter-track magnetic shielding.

In fabricating the multiple head 12, a plurality of the modules such as 10*a*–10*i* may either be bonded together by a suitable adhesive, or by suitable pins such as shown substantially and designated by reference numeral 70, which extend through aligned openings in the module. It has been found in practice that each of the modules 10 are so dimensionally stable after fabrication by the process to be described hereinafter, that there is little or no necessity to align either the tracks or the gaps, as normally required. Thus, it will be understood that once the modules are fabricated, it is relatively easy to form a multiple head having as many tracks as desired. Further, as will be seen in FIG. 6, the connector pins 42 extend outwardly from the multiple head 12, which can be readily plugged into a female receptacle or wired in any desired manner.

Having described the construction of the module 10 and the multiple head 12, the preferred process for fabricating the head will now be described with specific reference to FIGS. 1–5 and 7. Used in the fabrication of the module 10 is a fixture or tool generally designated by reference numeral 76. In practice, the fixture 76 is a dimensionally stable structure, consisting of a steel body portion 78, cover 80, slide 82 and end plate 85, the function of each of which will be explained hereinafter. While the fixture used in actual practice was steel, it could also be constructed of a dimensionally stable non-magnetic material such as an aluminum-manganese alloy or one of the various marine brasses. This would permit magnetic phasing tests to be conducted on the module without interference from the fixture, as well as the present continuity tests that are conducted on the leads 22 and 24 and coils 20.

The tool or fixture 76 has a central recess 84 in the body member for receiving the various components of the module 10. A pair of fixed locating pins 86 and 88 are mounted so as to extend upwardly in the recess 84. Also extending upwardly into the recess 84 are a pair of movable camming pins 90 and 92. The pins 86, 88, 90 and 92 are provided for receiving the various components of the tape head module 10. Thus, as will be seen in particular in FIG. 1, each of the various laminae or components of the module 10 except the pin carrier 40 have pairs of apertures 96 and 98 and 100 and 102 which permit them to be received on the pin pairs 86 and 88, 90 and 92. As will be seen, the apertures 96 and 98 are substantially the same size as the pins 86 and 88, while the apertures 100 and 102 are elongated and somewhat larger than the pins 90 and 92. Also, it will be observed that the pins 90 and 92 are received in elongated openings 104 and 106 respectively in the body member 78 so that they can be moved relative to the pins 86 and 88. The U-shaped pin carrier 40 is wide enough so that its legs 54 and 56 locate outside the pins, and therefore does not have apertures therein.

The end plate 85 has four lead receiving or snubbing posts, each of which is designated by reference numeral 110, for receiving the coils leads 22 and 24 during fabrication of the module 10. The slide 82, which is an aligning slide and movable between the positions shown in FIG. 1 and FIG. 2, is slidably attached to the body member 78 by means of screw 112 and slot 114 in the slide 76. The slide 76 has a pair of spaced apart legs 114 and 116 providing an aligning channel 118 therebetween. The cover 80 has a pair of apertures 120 and 122 for receiving screws 124 and 126 respectively for fastening the cover 80 onto the body member 78. In addition, there are a pair of smaller apertures 130 and 132 and a pair of larger apertures 134 and 136 that permit the cover 80 to be seated into the recess 84 over the fixed and movable pairs of locating pins.

Figure 7:
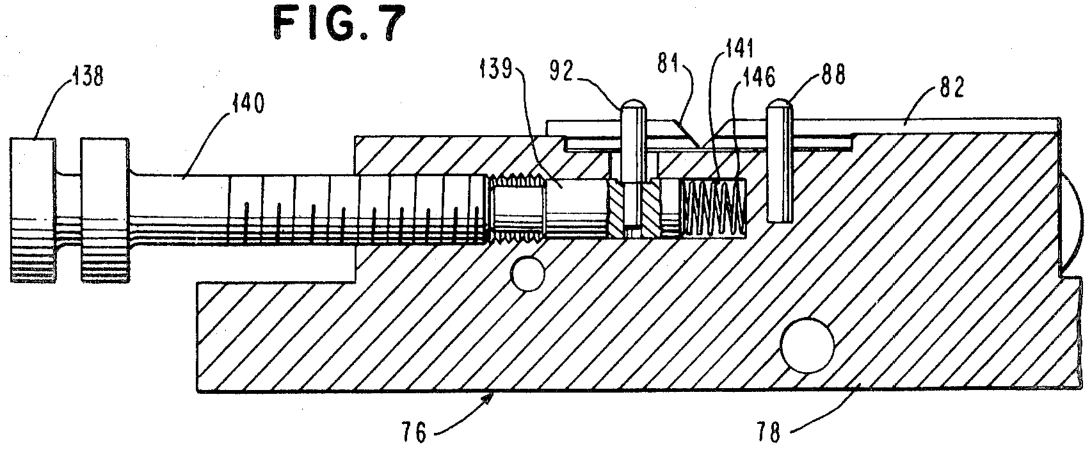
FIG. 7 is an enlarged partial cross-sectional view showing the fixture that is used in fabricating the module of the present invention.

The movable pins 90 and 92 are separately movable by means of threaded actuating means or members 138 and 140. Referring to FIG. 7, it will be seen that the pin 92 is fixedly mounted in a rod 139, and that member 140 is threadedly received in an opening 141 in the body member 78. There is a spring 146 seated in the opening 91 which normally urges the rod 139 against the threaded member 140.

In accordance with the preferred manner of fabricating the module 10, initially the magnetic shield 32 is placed downwardly over the fixed and movable locating pins, with the movable pins 90 and 92 in their rearward, or left-most position in FIG. 1. The adhesive sheet 34, window 36 and adhesive sheet 46 are then placed onto the pins in the recess 84. The pin carrying member 40 is then placed into the recess 84. Means are provided for fixedly locating the pin carrier 40 with respect to the fixture 76 and therefore also with respect to the remaining components of the module. This means is either of the slots 150 or 152 which are adapted to receive the right-most connector pin 42*a*, depending upon the preferred placement of the four connector pins. That is to say, the fixture 76 is adapted for the fabrication of two different style modules 10, with the difference therebetween being in the placement of the connector pins 42. In either case, however, the slots 150 and 152 insure the accuracy of alignment of the pin carrier 40 with respect to the remaining components of the module 10.

With the pin carrier 40 in place in the recess 84, the core and coil assemblies 14 and 16 are placed onto the locating pins. It will be understood that the core 20 of core and coil assembly 16 is placed onto fixed locating pins 86 and 88, while the core 20 of core and coil assembly 14 is placed onto the removable locating pins 90 and 92. It will be seen that each of the openings 96, 98, 100 and 102 in the two coils 20 is substantially of the same size, and thus fits tightly over the four pins. It will also be understood, that by virtue of the spacing of the arms 54 and 56 of the pin carrier 40, the core and coil assemblies 14 and 16 fit between the arms and down against the underlying adhesive sheet 46.

In order to accurately set the spacing of the working gap 26, the gap spacer 28 is placed between the cores 20 of the core and coil assemblies 14 and 16, and these assemblies adjusted relative to each other. This is accomplished, in accordance with the preferred embodiment, while the parts are in place in the fixture 76, by actuating the members 138 and 140 to drive the movable pins 90 and 92 from their retracted to their forward positions within the apertures 104 and 106. However, it will be appreciated that by virtue of the angular gap, or the angle at which each of the cores 20 is cut, there is a tendency as the cores slide together for them to move traversely to one another. That is to say, there is a tendency for the core 20 of core and coil assembly 14 to ride upwardly with respect to the core 20 of core and coil assembly 16. In order to prevent this, the aligning slide 82 is moved to the position shown in FIG. 2. When the slide 82 is in the position shown in FIG. 2, the cores 20 of both core and coil assemblies 14 and 16 are contained within the aligning channel 118 so as to be unable to move traversely with respect to each other, or to move at all with respect to the fixture 76. Accordingly, it will be appreciated that the working gap 26 may be set by moving core and coil assembly 14 toward core and coil assembly 16 until the gap spacer 28 is squeezed and prevents further movement, while preventing any misalignment of the cores 20 relative to each other. Furthermore, it will be appreciated that the relative position of the cores 20 may be visually inspected by means of the V-shaped notch 81 in slide 82, and the previously mentioned peep-hole 60 in the carrier 40. Thus, the gap 26 may be seen through the notch 81, and the lower end of the cores 20 may be seen through the peep-hole 60 as the core and coil assembly 14 is being moved toward the core and coil assembly 16.

Figure 4:
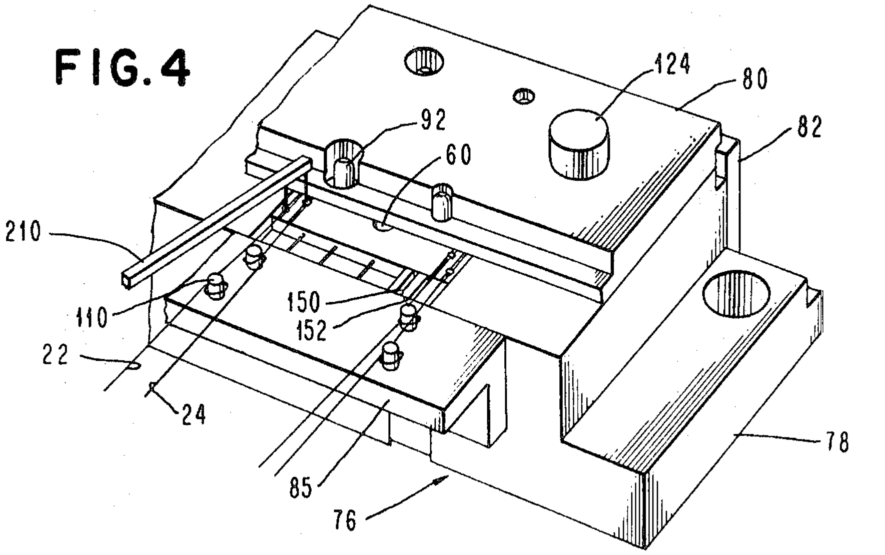
FIG. 4 is a perspective view of the fixture with the components assembled, showing the welding step comprising one aspect of the present invention.
Figure 5:
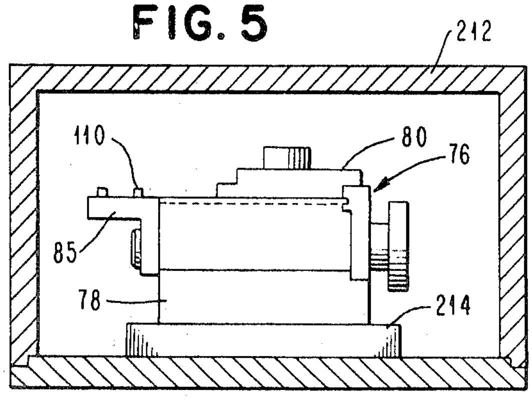
FIG. 5 is a simplified cross-sectional view showing the laminating step of the present invention, with the loaded fixture in place in an oven.

When the working gap 26 is set, as described above, it is necessary to fasten the coil leads 22 and 24 of each coil 20 to the connector pins 42. This is readily accomplished by virtue of the configuration of the pin carrier member 40, and as well by the construction of the fixture 76. In order to fasten the leads to the connector pins 42, the leads are initially strung or routed through the channels **52*a* and 52*b* and wrapped around or snubbed on the posts 110, which, as will be seen in FIGS. 1 and 4 are aligned with channels 52*a* and 52*b* on each side of the member 40. With the four leads snubbed on the four posts 110, portions of the leads are directly over the accessible or exposed welding pads 48*a* and 48*b* and may be readily welded thereto as shown in FIG. 4. By referring to FIG. 4, it will be seen that a welding fixture generally designated by reference numeral 210 accomplishes the welding through the openings 50*a* and 50*b* in the pin carrier 40. After the four leads are welded to their pads, it is then possible to perform continuity checks to determine if any of the leads or coils are broken, if desired. Also, it will be appreciated that if desired, such continuity checks may be made prior to welding the leads to the pads. Furthermore, as mentioned above, it is possible to perform magnetic phasing tests upon the coils to determine if they are correctly wound, if a non-magnetic fixture 76 is used. It will also be realized that the leads could be soldered rather than welded to the pads. At this point, it will be well to note that one advantage of the present process is that the module may be repaired prior to final lamination of the components, i.e., prior to activation of the various adhesive sheets to join the components of the unit together. Thus, if a coil is out of phase, or if a wire has broken, it is not necessary to throw away the entire module. The defective core and coil assembly may be taken out and replaced merely by backing off the pins 90 and 92, moving slide 82** to the right and then removing either of the core and coil assemblies.

It would also be appropriate to note at this point that the welding of the core leads to the weld pad is facilitated by the placement of the routing channels 52. That is to say, the channels provide a guiding function for the leads, enabling the leads to be readily strung therealong, and also protect the wires during welding and thereafter.

After the coil leads are welded and the various tests are completed, another adhesive sheet 64 is placed into the recess 84 over the pins 86, 88, 90 and 92 and in contact with the pin carrier 40 and core and coil assemblies 14 and 16. The magnetic shielding window 66 is then placed downwardly over the pins and the cover 80 fastened onto the body member 78 of the fixture 76. At this time, the entire fixture 76 is placed into the oven 212 on the pallet 214 as shown schematically in FIG. 5. The lamination of the various components of the module 10 is completed by subjecting the module to a temperature in the vicinity of 180° C. for approximately two hours. This permits the B-stage epoxy in the adhesive sheets to set-up or cure and rigidly fasten together or bond all of the components of the module. When the load fixture 76 is taken out of the oven 212, the cover 80 is removed, and the finished module 10 taken from the fixture 76. No further cutting or grinding of module 10 is normally required prior to incorporation of the finished module 10 into a multiple head 12. This is one outstanding feature of the invention. In addition, another outstanding feature of the invention is that no potting or molding is necessary at the module stage since the components are bonded together by the adhesive and laminated in that manner. The assemblers therefore do not have to work with epoxys and are not subjected to the various noxious vapors therefrom, they are not involved in the setting up of molds and the handling involved in a molding operation, nor does the module have to be subjected to the rather long cycling time required for curing, molding potting compounds. Furthermore, the fixture permits a precise spacing of a 45° gap, with respect both to gap width and track width, which would otherwise be costly and time consuming by previous methods.

While the invention has been particularly shown and described with reference to a preferred embodiment thereof, it will be understood by those skilled in the art that various changes in form and details may be made therein without departing from the spirit and scope of the invention.

What is claimed is:

1. A process of producing a magnetic transducing head module, comprising:

providing a fixture having both fixed and movable means for receiving components of the module;

placing at least a magnetic shield and a first heat-activatable adhesive means within said fixture;

placing a pin carrying member within said fixture;

mounting first and second core and coil assemblies respectively on said fixed receiving means and said movable receiving means;

actuating the movable receiving means to move the core and coil assembly associated therewith toward the core and coil assembly associated with said fixed receiving means to adjust the first and second core and coil assemblies relative to each other to form a working gap;

placing at least a second heat-activatable adhesive over said pin carrying member and said first and second core and coil assemblies;

connecting the coils of said core and coil assemblies to the pins carried by said pin carrying member; and activating said adhesive means to fasten together the components of said module.

2. The process of claim 1 including the step of preventing transverse movement of the first and second core and coil assemblies relative to one another while performing the step of adjusting the first and second core and coil assemblies.

3. The process of claim 1 wherein the step of placing a pin carrying member within said fixture includes locating the pin carrying member with respect to the fixture and to the other components of the module.

4. A process of fabricating a laminar-like module for use in a multiple magnetic transducing head, the process comprising:

stacking in a fixture at least a magnetic shielding member, heat activatable adhesive means, a pin carrying member and first and second core and coil assemblies;

actuating camming means in the fixture and thereby moving one of said first and second core and coil assemblies toward the other of said first and second core and coil assemblies while holding the other of first and second core and coil assemblies stationary and thereby providing a working gap therebetween while in the fixture;

preventing relative transverse movement between said first and second core and coil assemblies while providing a working gap between said first and second core and coil assemblies;

attaching coil leads from the coils of said first and said second assemblies to pin means carried in said pin carrying member;

stacking in said fixture at least an additional heat activatable adhesive means over first and second core and coil assemblies, and another magnetic shielding means over said another heat activatable means; and causing said adhesive means to fasten together the magnetic shielding means, the pin carrier member and the first and second core and coil assemblies.

5. The process of claim 4 wherein the step of preventing relative transverse movement of said first and second core and coil assemblies includes actuating a slide means carried by the fixture and thereby physically restraining the first and second core and coil assemblies from transverse movement relative to each other.

References Cited

UNITED STATES PATENTS

| | | | |
|---|---|---|---|
| 3,064,333 | 11/1962 | Kristiansen et al. | 29—603 |
| 3,120,696 | 2/1964 | Lubkin | 29—603 |
| 3.319,238 | 5/1967 | Jacoby | 29—603 X |
| 3,395,450 | 8/1968 | Koorneef et al. | 29—603 |
| 3,400,386 | 9/1968 | Sinnott | 29—603 X |

JOHN F. CAMPBELL, Primary Examiner

C. E. HALL, Assistant Examiner

U.S. Cl. X.R.

179—100.2 C